United States Patent
Sarsen et al.

(10) Patent No.: US 8,904,757 B2
(45) Date of Patent: Dec. 9, 2014

(54) SYSTEM AND METHOD FOR CONTROLLING REGENERATION WITHIN AN AFTER-TREATMENT COMPONENT OF A COMPRESSION-IGNITION ENGINE

(75) Inventors: Douglas Christopher Sarsen, Howell, MI (US); Christopher C. Swoish, Lapeer, MI (US); Christopher Whitt, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 270 days.

(21) Appl. No.: 13/351,506

(22) Filed: Jan. 17, 2012

(65) Prior Publication Data

US 2013/0180230 A1      Jul. 18, 2013

(51) Int. Cl.
*F01N 3/00* (2006.01)
(52) U.S. Cl.
USPC ............................................. 60/277; 60/311
(58) Field of Classification Search
USPC .................................. 60/272–324
See application file for complete search history.

(56) References Cited

U.S. PATENT DOCUMENTS

| | | | |
|---|---|---|---|
| 5,319,930 A * | 6/1994 | Shinzawa et al. | 60/286 |
| 6,758,039 B2 * | 7/2004 | Kuboshima et al. | 60/311 |
| 6,969,413 B2 * | 11/2005 | Yahata et al. | 55/282.3 |
| 7,310,941 B2 * | 12/2007 | Kuboshima et al. | 60/297 |
| 7,322,340 B2 * | 1/2008 | Ohga et al. | 123/299 |
| 7,458,206 B2 * | 12/2008 | Yahata et al. | 60/297 |
| 8,161,738 B2 * | 4/2012 | He et al. | 60/296 |
| 2005/0154523 A1 | 7/2005 | Yahata et al. | |
| 2006/0032217 A1 * | 2/2006 | Kondou et al. | 60/297 |
| 2006/0179826 A1 | 8/2006 | Kuboshima et al. | |
| 2009/0056316 A1 * | 3/2009 | Haseyama et al. | 60/286 |
| 2010/0319319 A1 * | 12/2010 | Ide | 60/277 |

FOREIGN PATENT DOCUMENTS

| | | |
|---|---|---|
| CN | 1734067 A | 2/2006 |
| CN | 1757886 A | 4/2006 |

OTHER PUBLICATIONS

Chinese Office Action for Application No. 201310016913.8 dated Aug. 22, 2014; 7 pages.

* cited by examiner

*Primary Examiner* — Jesse Bogue
(74) *Attorney, Agent, or Firm* — Cantor Colburn LLP

(57) ABSTRACT

Method for controlling regeneration within an after-treatment component of an engine comprises receiving an upstream temperature signal, receiving a downstream temperature signal, and calculating a temperature difference based on a difference between the upstream temperature signal and the downstream temperature signal. The temperature difference is compared to a predetermined temperature change limit to determine whether the temperature difference is less than or greater than the predetermined temperature change limit. If the temperature difference is less than the predetermined temperature change limit, an estimate of accumulated particulate matter in the after-treatment component is calculated using a primary soot accumulation model. If the temperature difference is greater than the predetermined temperature change limit, an estimate of accumulated particulate matter in the after-treatment component is calculated using a secondary soot accumulation model. The estimate of accumulated particulate matter in the after-treatment component is compared to a predetermined threshold associated with the after-treatment component.

20 Claims, 2 Drawing Sheets

SYSTEM AND METHOD FOR CONTROLLING REGENERATION WITHIN AN AFTER-TREATMENT COMPONENT OF A COMPRESSION-IGNITION ENGINE

FIELD OF THE INVENTION

The subject invention relates to after-treatment systems for compression-ignition engines and more particularly to a system and method for controlling regeneration within an after-treatment component of a compression-ignition engine.

BACKGROUND

The emission of particulate matter in exhaust from compression-ignition engines is regulated for environmental reasons. Thus, vehicles equipped with compression-ignition engines often include after-treatment components such as particulate filters, catalyzed soot filters and adsorption catalysts for removing particulate matter and other regulated constituents (e.g., nitrogen oxides or NOx) from their exhaust streams. Particulate filters and other after-treatment components can be effective, but can also increase back pressure as they collect particulate matter.

Particulate matter may include ash and unburned carbon particles generally referred to as soot. As this carbon-based particulate matter accumulates in the after-treatment components, it can increase back pressure in the exhaust system. Engines that have large rates of particulate mass emission can develop excessive back pressure levels in a relatively short period of time, decreasing engine efficiency and power producing capacity. Therefore, it is desired to have particulate filtration systems that minimize back-pressure while effectively capturing particulate matter in the exhaust.

To accomplish both of these competing goals, after-treatment components must be regularly monitored and maintained either by replacing components or by removing the accumulated soot. Cleaning the accumulated soot from an after-treatment component can be achieved via oxidation to CO2 (i.e., burning-off) and is known in the art as regeneration. To avoid service interruptions, regeneration is generally preferred over replacement of after-treatment components.

One way that regeneration may be accomplished is by increasing the temperatures of the filter material and/or the collected particulate matter to levels above the combustion temperature of the particulate matter. Elevating the temperature facilitates consumption of the soot by allowing the excess oxygen in the exhaust gas to oxidize the particulate matter. Particulate matter may also be oxidized, and thus removed, at lower temperatures by exposing the particulate matter to sufficient concentrations of nitrogen dioxide (NO2). Exhaust from a compression-engine, such as a diesel engine, typically contains NOx, which consists primarily of nitric oxide (NO) and approximately 5 to 20 percent NO2, with greater levels of NO2 being common where oxidation catalysts are present in the exhaust stream. Thus, some level of regeneration occurs even at relatively low temperatures.

The regeneration process can be either passive or active. In passive systems, regeneration occurs whenever heat (e.g., carried by the exhaust gasses) and soot (e.g., trapped in the after-treatment components) are sufficient to facilitate oxidation, and/or whenever sufficient concentrations of NO2 are present in the exhaust to enable oxidation at lower temperatures. In active systems, regeneration is induced at desired times by introducing heat from an outside source (e.g., an electrical heater, a fuel burner, a microwave heater, and/or from the engine itself, such as with a late in-cylinder injection or injection of fuel directly into the exhaust stream). Active regeneration can be initiated during various vehicle operations and exhaust conditions. Among these favorable operating conditions are stationary vehicle operations such as when the vehicle is at rest, for example, during a refueling stop. Engine control systems can be used to predict when it may be advantageous to actively facilitate a regeneration event and to effectuate control over the regeneration process.

An engine control system may use a soot model to deduce (i.e., predict) a mass of soot accumulated in the after-treatment component by monitoring properties of the exhaust stream as it flows through the after-treatment component. The control system can use the deduced soot mass data to monitor soot loading over time, to determine or anticipate when regeneration may be necessary or desirable, to facilitate a regeneration event, and/or to effectuate control over a regeneration process or other remedial measures. In one exemplary soot model, the pressure decrease across a loaded after-treatment component may be used, along with knowledge of the relationship between soot accumulation and pressure decrease, to estimate the extent of soot loading in the after-treatment component. This is possible because, as soot accumulates in an after-treatment component, the pressure decrease typically increases (at specific temperature and volumetric flow rates) from pressure decreases experienced when the after-treatment component is clean.

Because changes in temperature, pressure, and flow rate affect the pressure decrease experienced by exhaust as it passes through an after-treatment component, the accuracy and reliability of measurements for these parameters is important. Ideal gas laws may also be used to adjust flow rates for changing temperatures and pressures, further adding to the importance of accurate determinations for these parameters. Unfortunately, however, a number of difficulties have been encountered determining temperatures in and around after-treatment components. For example, experience has shown that exhaust gas temperatures can deviate significantly from material temperatures in an after-treatment component, particularly during non-steady, or transient, operation. This is due to significant thermal inertias that may exist in typical after-treatment components, which can be accompanied by correspondingly large temperature gradients as the components respond to transient operating conditions. Therefore, as a result of the large dependency on an accurate temperature measurement, errors can be caused by temperature gradients occurring in after-treatment components.

Accordingly, it is desirable to provide an improved system and method for determining when to facilitate active regeneration and for controlling active regeneration of particulate filtration systems, particularly having improved model accuracy in the presence of large temperature gradients occurring in and around after-treatment components.

SUMMARY OF THE INVENTION

In one exemplary embodiment of the invention, a method for controlling regeneration within an after-treatment component of an engine comprises receiving an upstream temperature signal representing a temperature upstream from the after-treatment component, receiving a downstream temperature signal representing a temperature downstream from the after-treatment component, and calculating a temperature difference across the after-treatment component based on a difference between the upstream temperature signal and the downstream temperature signal. The temperature difference across the after-treatment component is compared to a predetermined temperature change limit to determine whether the temperature difference across the after-treatment component is less than or greater than the predetermined temperature change limit.

If the temperature difference across the after-treatment component is less than the predetermined temperature change limit, an estimate of accumulated particulate matter in the after-treatment component is calculated using a primary soot accumulation model. If the temperature difference across the after-treatment component is greater than the predetermined temperature change limit, an estimate of accumulated particulate matter in the after-treatment component is calculated using a secondary soot accumulation model. The estimate of accumulated particulate matter in the after-treatment component is compared to a predetermined threshold associated with the after-treatment component, and a remedial action is initiated when the estimate of accumulated particulate matter in the after-treatment component exceeds the predetermined threshold.

In another exemplary embodiment of the invention, a system for controlling regeneration within an after-treatment component comprises a regeneration controller having a processor coupled to a memory storage device. The regeneration controller is configured to receive an upstream temperature signal representing a temperature upstream from the after-treatment component, to receive a downstream temperature signal representing a temperature downstream from the after-treatment component, and to calculate a temperature difference across the after-treatment component based on a difference between the upstream temperature signal and the downstream temperature signal.

The regeneration controller is also configured to compare the temperature difference across the after-treatment component to a predetermined temperature change limit to determine whether the temperature difference across the after-treatment component is less than or greater than the predetermined temperature change limit, to calculate an estimate of accumulated particulate matter in the after-treatment component using a primary soot accumulation model if the temperature difference across the after-treatment component is less than the predetermined temperature change limit, and to calculate an estimate of accumulated particulate matter in the after-treatment component using a secondary soot accumulation model if the temperature difference across the after-treatment component is greater than the predetermined temperature change limit. The regeneration controller is also configured to compare the estimate of accumulated particulate matter in the after-treatment component to a predetermined threshold associated with the after-treatment component and to initiate a remedial action when the estimate of accumulated particulate matter in the after-treatment component exceeds the predetermined threshold.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
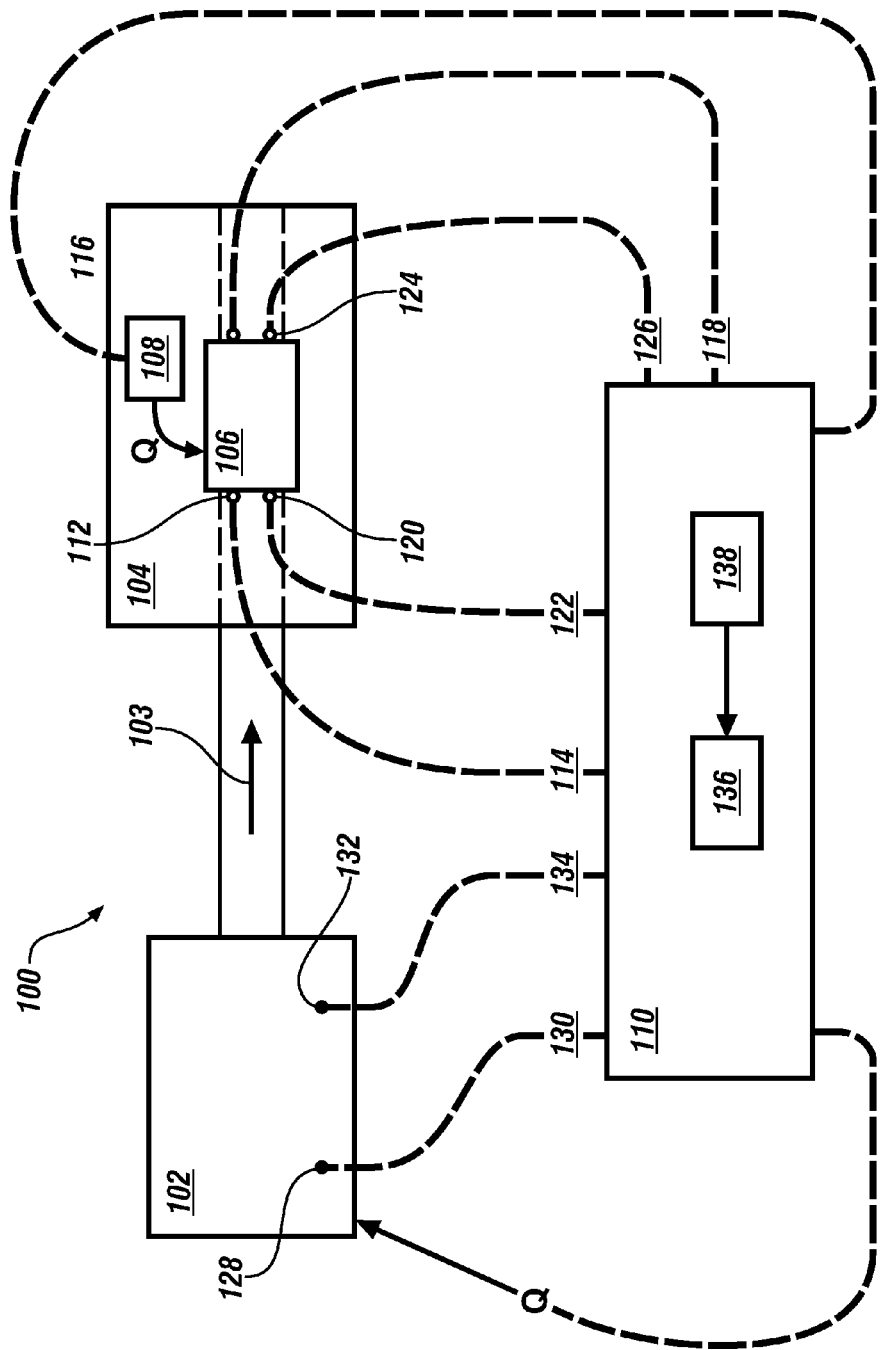
FIG. 1 is a schematic diagram showing an exemplary system for controlling regeneration within an after-treatment component of a compression-ignition engine.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, as shown in FIG. 1, an exemplary system 100 for controlling regeneration within an after-treatment component of a compression-ignition engine includes a compression-ignition engine 102 coupled to an exhaust system 104, through which exhaust 103 from engine 102 passes and is treated before being discharged to the atmosphere. Exhaust system 104 includes at least one after-treatment component 106 such as a particulate filter for removing particulate matter and other regulated constituents from the exhaust stream. A heater 108 is configured for adding heat to the after-treatment component 106 to induce regeneration in the after-treatment component 106. A regeneration controller 110 is configured to predict when it may be necessary or advantageous to undergo regeneration in the after-treatment component and, when appropriate, to actively facilitate a regeneration event. The regeneration controller 110 may facilitate such an event, for example, by introducing heat to the after-treatment component 106 from an outside source such as the heater 108 or by causing injection of fuel into the engine 102 or the exhaust system 104.

To enable the regeneration controller 110 to better perform its functions, various instruments are positioned within the engine 102 and the exhaust system 104. The instruments are configured to be responsive to changes in relevant parameters in the engine 102 and the exhaust system 104 and to transmit signals to the regeneration controller 110 with the signals being indicative of operation of the engine 102 and the after-treatment component 106. For example, in an exemplary embodiment, an upstream pressure sensor 112 measures pressures of the exhaust stream 103 upstream from the after-treatment component 106 and produces upstream pressure signals 114. Similarly, a downstream pressure sensor 116 measures pressures of the exhaust stream 103 downstream from the after-treatment component 106 and produces downstream pressure signals 118. In addition, an upstream temperature sensor 120 measures temperatures of the exhaust stream 103 upstream from the after-treatment component 106 and produces upstream temperature signals 122. A downstream temperature sensor 124 measures temperatures of the exhaust stream downstream from the after-treatment component 106 and produces downstream temperature signals 126. An engine speed sensor 128 senses speeds of the engine 102 and produces engine speed signals 130. An engine flow sensor 132 senses mass flow rates of working fluid (e.g., air or air and fuel or exhaust gas) flowing in the engine 102 or exhaust system 104 and produces engine flow rate signals 134.

The regeneration controller 110 receives information, such as one or more of the upstream pressure signals 114, downstream pressure signals 118, upstream temperature signals 122, downstream temperature signals 126, engine speed signals 130, and engine flow rate signals 134 from the upstream pressure sensor 112, the downstream pressure sensor 116, the upstream temperature sensor 120, the downstream temperature sensor 124, the engine speed sensor 128, and the engine flow sensor 132. A processor 136 of the regeneration controller 110 cooperates with a memory 138 associated with the regeneration controller 110 to execute instructions that are configured to enable the regeneration controller 110 to monitor soot loading in the after-treatment component 106, to determine or anticipate when regeneration in the after-treatment component 106 may be necessary or desirable, to facilitate a regeneration event in the after-treatment component 106, and/or to effectuate control over a regeneration process or other remedial measures.

For example, in an exemplary embodiment, a regeneration controller 110 is configured to estimate a quantity of particulate matter accumulation in the after-treatment component 106 based on a pressure decrease index that is indicative of a decrease in pressure of the exhaust stream as it passes through the after-treatment component 106. In an exemplary embodiment, the regeneration controller 110 uses the upstream pressure signals 114 and the downstream pressure signals 118 to compute the pressure decrease index. In addition, the regeneration controller 110 uses the engine flow rate signals 134 or the engine speed signals from the engine speed sensor 128 or the engine flow sensor 132 to generate a flow rate index. Still further, the regeneration controller 110 uses the upstream temperature signals 122 and the downstream temperature signals 126 to compute a temperature index indicative of a temperature of the exhaust stream 103 or of a change in temperature of the exhaust stream as it passes through the after-treatment component 106. In situations where one or more of the temperature signals (e.g., one of the upstream temperature signals 122 and the downstream temperature signals 126) do not exist or are deemed unreliable, or in situations where greater detail in terms of temperatures within the after-treatment component 106 may be desired, a simulation model may be used to estimate one or more temperatures at one or more locations within the after-treatment component based on other known temperatures. Then, based on the additional temperature detail, a more accurate temperature index may be generated.

Once the properties of the flow stream have been generated, the regeneration controller 110 estimates a quantity of particulate matter accumulation in the after-treatment component 106. In an exemplary embodiment, the regeneration controller 110 uses a soot accumulation model based on soot rate maps developed using engine-out conditions. In another exemplary embodiment, the regeneration controller 110 uses a soot accumulation model based on the relationship between the pressure decrease index, the flow rate index, and the temperature index. As one skilled in the art will appreciate, increases in the amount of pressure decrease (i.e., change) at a constant flow rate and temperature is indicative of accumulation of soot or other particulate matter in the after-treatment component 106. Those skilled in the art will also appreciate that the flow rate index may be normalized to a standardized temperature and a standardized pressure (e.g., according to the ideal gas law) so as to eliminate some or all of the inaccuracies associated with changes in temperature and pressure of the exhaust stream 103. This is possible because it is known that a consistent relationship may exist between pressure loss and such a corrected flow rate even though temperature and/or pressure of the flow may change.

It has been recognized that the existence of some extreme or non-steady or transient conditions in the exhaust stream 103 and/or in the after-treatment component 106 may result in inaccuracies in the determination of temperature or other relevant parameters. Therefore, in an exemplary embodiment, the regeneration controller 110 determines whether to rely upon a primary soot accumulation model, such as a pressure-based soot model, or a secondary soot accumulation model or another back-up technique. The decision which technique to use may be based on the temperature measured upstream from the after-treatment component, and temperature measured downstream from the after-treatment component, and a modeled surface temperature within the after-treatment component. For example, when the temperature measured upstream from the after-treatment component exceeds a predetermined threshold, the regeneration controller 110 may choose to rely upon an alternative soot estimation technique rather that using a pressure-based prediction method that may be unreliable at the excessively high temperature. In an exemplary embodiment, an alternative soot estimation technique relies upon a soot accumulation model that is based on soot rate maps developed based on engine-out conditions. At such conditions, the regeneration controller 110 may also disable the pressure-based soot model so as to avoid generating or using an unreliable estimate of soot accumulation. The regeneration controller 110 may choose to rely upon an alternative soot estimation technique whenever the temperature difference (or gradient) across the after-treatment component exceeds a predetermined threshold. In accordance with such embodiments, the regeneration controller 110 may facilitate the setting and adjustment of limits on the temperature gradient and rate of temperature change, above which the pressure-based soot accumulation model is not executed or relied upon for soot estimation.

It should be appreciated that a number of expressions exist for quantifying and tracking pressure decrease in an after-treatment component. For example, in one embodiment, the pressure decrease index is calculated as a ratio of upstream pressure to downstream pressure (i.e., $PR=Pu/Pd$) so as to represent a pressure ratio across the after-treatment component. In another embodiment, the pressure decrease index is calculated as a difference between the upstream pressure and the downstream pressure (i.e., $DP=Pu-Pd$) so as to represent a difference in pressure across the after-treatment component. In still another embodiment, the pressure decrease index is calculated as the difference between the upstream pressure and the downstream pressure, with the difference divided by the magnitude of the upstream pressure (i.e., as a normalized pressure decrease, $DPP=DP/Pu$) so as to represent a normalized difference in pressure across the after-treatment component. As those skilled in the art will appreciate, the above-described flow rate index signal can be produced by an engine speed sensor or a mass airflow sensor or any other sensor configured to sense an engine operating condition that is indicative of the relative flow rate of the exhaust stream 103.

In addition, the regeneration controller 110 is configured to determine a rate of change of any of the above-described parameters. For example, a rate of change may be calculated by capturing a first signal associated with a first parameter (e.g., one of the upstream pressure signals 114, downstream pressure signals 118, upstream temperature signals 122, downstream temperature signals 126, engine speed signals 130, engine flow rate signals 134, or one of the indexes described above) at a first time, and capturing a second reading associated with that same parameter at a second time, wherein the second time occurs an incremental amount of time after the first time. Then, the regeneration controller 110 may determine a change in the readings associated with the first parameter by calculating a difference between the second reading and the first reading. From that change, the regeneration controller 110 may determine a rate of change in the readings associated with the first parameter.

When a pressure-based soot accumulation model is to be executed or relied upon for soot estimation, the regeneration controller 110 may estimate the accumulated particulate matter in the after-treatment component based, at least in part, on a soot accumulation model. As described above, the model may require knowledge of the pressures, temperatures, and flow rates of the exhaust stream 103 as described above. In an exemplary embodiment, the estimate produced by the model represents the amount of particulate matter that is predicted to have accumulated in the after-treatment component. The pressure-based soot accumulation model, which may be based on empirical data, is configured to reflect the relationship between the amount of particulate matter that has accumulated in the after-treatment component, the pressure decrease index, the flow index, and the temperature index.

Since the estimate of matter accumulated in the after-treatment component is to be compared to a predetermined threshold associated with the after-treatment component, and since a remedial action may be facilitated when the adjusted estimate of accumulated particulate matter in the after-treatment component exceeds the predetermined threshold, inaccuracies in the process would have the potential to trigger regeneration processes unnecessarily or late. Therefore, by relying upon an alternative soot estimation technique whenever the temperature difference (or gradient) across the after-treatment component exceeds a predetermined threshold, the regeneration controller 110 may improve reliability of the estimated level of soot accumulation, thereby reducing the need for excessive margins and potentially eliminating unnecessary service.

Figure 2:
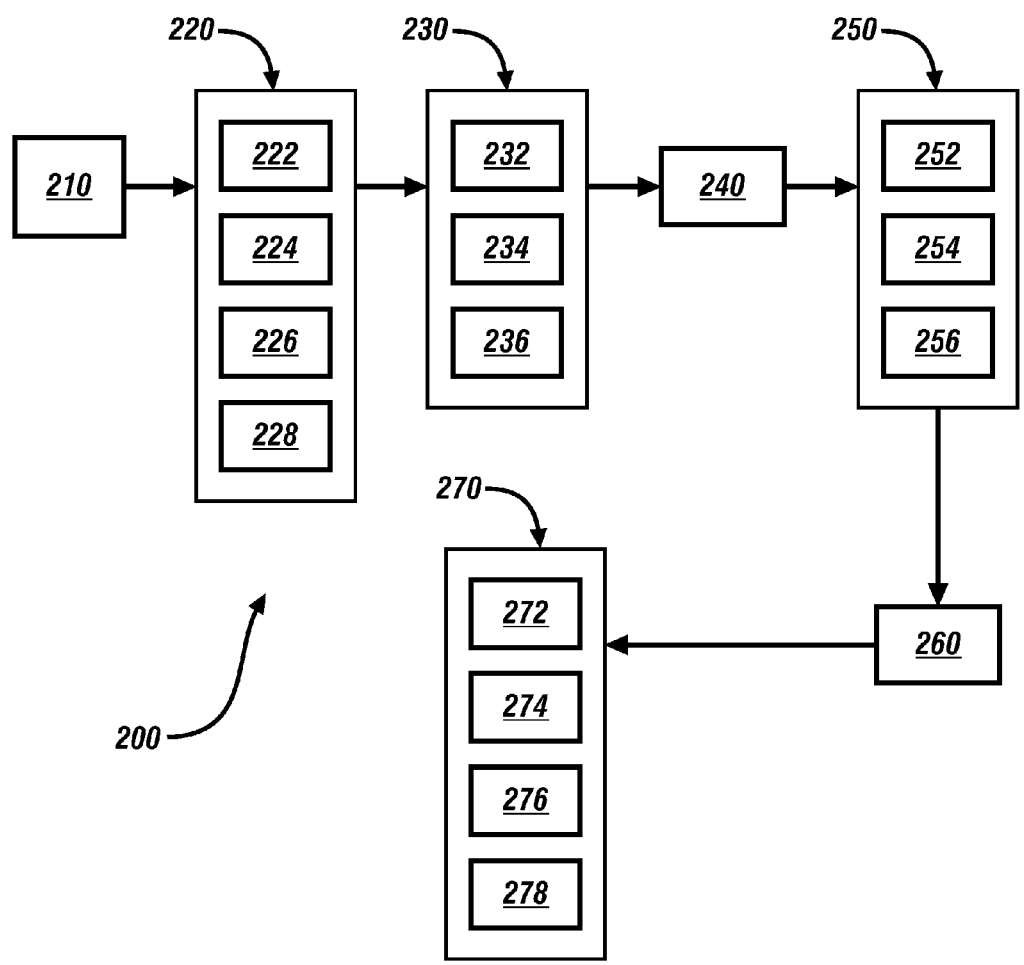
FIG. 2 is a process flow diagram showing an exemplary process for controlling regeneration within an after-treatment component of a compression-ignition engine.

In accordance with an exemplary embodiment of the invention, as shown in FIG. 2, an exemplary process 200 for controlling regeneration within an after-treatment component of a compression-ignition engine, such as a particulate filter, generally includes the step of receiving one or more values of one or more parameters associated with an exhaust stream passing through the after-treatment component (step 210). In an exemplary embodiment, the parameter may represent upstream pressure, downstream pressure, upstream temperature, downstream temperature, engine speed, or engine flow rate. The value may be received as a signal from the upstream pressure sensor 112, the downstream pressure sensor 116, the upstream temperature sensor 120, the downstream temperature sensor 124, the engine speed sensor 128, and the engine flow sensor 132. The parameter may be a pressure decrease index indicative of a decrease in pressure of an exhaust stream 103 as it passes through the after-treatment component 106, a flow rate index indicative of a rate of flow of the exhaust stream, or a temperature index indicative of a temperature of the exhaust stream.

In addition to receiving one or more values, the process 200 includes evaluating whether a temperature measured upstream from the after-treatment component exceeds a predetermined threshold (step 220). More specifically, this step of the process includes: (a) receiving an upstream temperature signal representing a temperature upstream from the after-treatment component (step 222); (b) receiving a downstream temperature signal representing a temperature downstream from the after-treatment component (step 224); (c) calculating a temperature difference across the after-treatment component based on a difference between the upstream temperature signal and the downstream temperature signal (step 226); and (d) comparing the temperature difference across the after-treatment component to a predetermined temperature change limit to determine whether the temperature difference across the after-treatment component is less than or greater than the predetermined temperature change limit (step 228).

When the temperature measured upstream from the after-treatment component does in fact exceed a predetermined threshold, the regeneration controller 110 chooses to rely upon an alternative (i.e., secondary) soot estimation technique rather than using a pressure-based prediction method that may be unreliable at the excessively high temperature (step 230). As discussed above, in an exemplary embodiment, the regeneration controller 110 may rely upon a soot accumulation model that is based on soot rate maps developed based on engine-out conditions (step 232). To facilitate use of an alternative model or technique, it may be necessary for the regeneration controller 110 to acquire additional parameters (step 234). In addition, the regeneration controller 110 may disable the pressure-based soot model (step 236) so as to avoid generating or using an unreliable estimate of soot accumulation. Still further, the regeneration controller 110 may facilitate the setting and adjustment of limits on the temperature gradient and rate of temperature change, above which the pressure-based soot accumulation model is not executed or relied upon for soot estimation (step 240).

When the temperature measured upstream from the after-treatment component does not exceed the predetermined threshold, the regeneration controller 110 may rely upon a primary soot estimation technique, such as a soot accumulation model based on pressure decrease, to calculate an estimate of accumulated particulate matter in the after-treatment component (step 250). In one embodiment, this calculation is based, at least in part, on a soot accumulation model and the values for pressure decrease index, flow rate index, and temperature index. The estimate of accumulated particulate matter in the after-treatment component is then compared to one or more predetermined thresholds associated with the after-treatment component (step 260). A remedial action is initiated when the adjusted estimate of accumulated particulate matter in the after-treatment component exceeds the predetermined threshold (step 270).

In an exemplary embodiment, and according to a primary estimation technique, the step of estimating the quantity of accumulated particulate matter in the after-treatment component (step 250) begins with the calculation or receipt of a pressure decrease index indicative of a decrease in pressure of an exhaust stream as it passes through the after-treatment component (step 252). In an exemplary embodiment, the pressure decrease index is indicative of the level of pressure decrease experienced by the exhaust stream 103 as it passes through the after-treatment component 106. In one embodiment, the pressure decrease index is calculated as a ratio of upstream to downstream pressure (i.e., $PR=P_u/P_d$) so as to represent a pressure ratio across the after-treatment component.

In another embodiment, the pressure decrease index is calculated as a difference between the upstream and downstream pressures (i.e., $DP=P_u-P_d$) so as to represent a difference in pressure across the after-treatment component. In still another embodiment, the pressure decrease index is calculated as the difference between the upstream and downstream pressures divided by the magnitude of the upstream pressure (i.e., as a normalized pressure decrease, $DPP=DP/P_u$) so as to represent a normalized difference in pressure across the after-treatment component. An exemplary step of estimating the quantity of accumulated particulate matter in the after-treatment component (step 250) also includes determining a flow rate index that is indicative of a relative flow rate of the exhaust stream (step 254). The flow rate index signal can be produced by an engine speed sensor or a mass airflow sensor or any other sensor configured to sense an engine operating condition that is indicative of the relative flow rate of the exhaust stream.

Once the pressure decrease index and the flow index of the exhaust stream 103 have been determined, an exemplary step of estimating the quantity of accumulated particulate matter in the after-treatment component (step 250) employs a pressure-based soot accumulation model (step 256) to estimate the accumulated particulate matter in the after-treatment component based on the pressure decrease index and the flow rate index. As discussed above, however, when the temperature measured upstream from the after-treatment component exceeds a predetermined threshold, the regeneration controller 110 may choose to rely upon an alternative soot estimation technique rather that using a pressure-based prediction method that may be unreliable at the excessively high temperatures (step 230). As discussed above, in an exemplary embodiment, when temperatures exceed the threshold, the regeneration controller 110 relies upon a soot accumulation model that is based on soot rate maps developed based on engine-out conditions (step 232).

Regardless of which technique is used, an estimate is produced representing an amount of particulate matter that is predicted to have accumulated in the after-treatment component. The pressure-based soot accumulation model, which may be based on empirical data, is configured to reflect the relationship between the amount of particulate matter that has accumulated in the after-treatment component, the pressure decrease index, and the flow index. Other techniques may reflect other relationships and may be similarly correlated to observed data.

In an exemplary embodiment, the step of initiating a remedial action (step 270) comprises adjusting one or more engine control parameters so as to modify operation of the engine to promote passive regeneration in the after-treatment component (step 272). For example, the one or more adjustments may be configured to provide a minimum temperature at the after-treatment component 106 promoting passive regeneration in the after-treatment component. Alternatively the one or more adjustments may comprise modifying fueling and timing of the engine (step 274) or activating an auxiliary heating element 108 to increase a temperature of the exhaust stream (step 276) or activating a warning light instructing the operator to initiate regeneration in (or replacement of) the after-treatment component (step 278).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method for controlling regeneration within an after-treatment component of an engine, comprising:
   receiving an upstream temperature signal representing a temperature of an exhaust stream upstream from the after-treatment component;
   comparing the upstream temperature to a predetermined temperature threshold to determine whether the upstream temperature is less than or greater than the predetermined temperature threshold;
   if the upstream temperature is less than the predetermined temperature threshold, calculating an estimate of accumulated particulate matter in the after-treatment component using a primary soot accumulation model, and if the upstream temperature is greater than the predetermined temperature threshold, calculating an estimate of accumulated particulate matter in the after-treatment component using a secondary soot accumulation model;
   comparing the estimate of accumulated particulate matter in the after-treatment component to a predetermined threshold associated with the after-treatment component; and
   initiating a remedial action when the estimate of accumulated particulate matter in the after-treatment component exceeds the predetermined threshold;
   wherein the primary soot accumulation model is configured to produce an estimate of accumulated particulate matter in the after-treatment component based on a first input parameter;
   wherein the secondary soot accumulation model is configured to produce an estimate of accumulated particulate matter in the after-treatment component based on a second input parameter; and
   wherein the first input parameter differs from the second input parameter.

2. The method of claim 1, wherein the primary soot accumulation model is based on a pressure decrease index indicative of a decrease in pressure of an exhaust stream as it passes through the after-treatment component.

3. The method of claim 1, wherein the primary soot accumulation model is based on a flow rate index indicative of a rate of flow of the exhaust stream.

4. The method of claim 1, wherein the primary soot accumulation model is based on a relationship between a pressure decrease index indicative of a decrease in pressure of an exhaust stream as it passes through the after-treatment component and a flow rate index indicative of a rate of flow of the exhaust stream.

5. The method of claim 1, wherein the secondary soot accumulation model is based on a soot rate map developed using an engine-out condition.

6. The method of claim 2, wherein the pressure decrease index represents a pressure ratio across the after-treatment component.

7. The method of claim 3, wherein the flow rate index is based on a speed of the engine.

8. The method of claim 1, wherein initiating a remedial action comprises adjusting one or more engine control parameters so as to modify operation of the engine to promote passive regeneration in the after-treatment component.

9. The method of claim 8, wherein said adjusting is configured to provide a minimum temperature at the after-treatment component to promote regeneration in the after-treatment component.

10. The method of claim 8, wherein said adjusting comprises modifying fueling and timing of the engine.

11. The method of claim 1, wherein said remedial action comprises activating an auxiliary heating element to increase a temperature of the exhaust stream.

12. The method of claim 8, wherein the remedial action comprises activating a warning light instructing an operator to initiate regeneration in the after-treatment component.

13. A system for controlling regeneration within an after-treatment component of an engine comprising:
   a regeneration controller having a processor coupled to a memory storage device, the regeneration controller being configured to:
   receive an upstream temperature signal representing a temperature of an exhaust stream upstream from the after-treatment component;

compare the upstream temperature to a predetermined temperature threshold to determine whether the upstream temperature is less than or greater than the predetermined temperature threshold;

calculate an estimate of accumulated particulate matter in the after-treatment component using a primary soot accumulation model if the upstream temperature is less than the predetermined temperature threshold;

calculate an estimate of accumulated particulate matter in the after-treatment component using a secondary soot accumulation model if the upstream temperature is greater than the predetermined temperature threshold;

compare the estimate of accumulated particulate matter in the after-treatment component to a predetermined threshold associated with the after-treatment component; and initiate a remedial action when the estimate of accumulated particulate matter in the after-treatment component exceeds the predetermined threshold;

wherein the primary soot accumulation model is configured to produce an estimate of accumulated particulate matter in the after-treatment component based on a first input parameter;

wherein the secondary soot accumulation model is configured to produce an estimate of accumulated particulate matter in the after-treatment component based on a second input parameter; and wherein the first input parameter differs from the second input parameter.

14. The system of claim 13, wherein the primary soot accumulation model is based on a pressure decrease index indicative of a decrease in pressure of an exhaust stream as it passes through the after-treatment component.

15. The system of claim 13, wherein the primary soot accumulation model is based on a flow rate index indicative of a rate of flow of the exhaust stream.

16. The system of claim 13, wherein the primary soot accumulation model is based on a relationship between a pressure decrease index indicative of a decrease in pressure of an exhaust stream as it passes through the after-treatment component and a flow rate index indicative of a rate of flow of the exhaust stream.

17. The system of claim 13, wherein the secondary soot accumulation model is based on a soot rate map developed using an engine-out condition.

18. The system of claim 14, wherein the pressure decrease index represents a pressure ratio across the after-treatment component.

19. The system of claim 15, wherein the flow rate index is based on a speed of the engine.

20. The system of claim 13, wherein initiating a remedial action comprises adjusting one or more engine control parameters so as to modify operation of the engine to promote passive regeneration in the after-treatment component.

* * * * *